(12) United States Patent
Chou et al.

(10) Patent No.: US 9,090,001 B2
(45) Date of Patent: *Jul. 28, 2015

(54) MELTBLOWN PROCESS FOR PRODUCING NON-WOVEN FABRICS WITH FLAME-RETARDING CAPABILITY FROM NATURAL CELLULOSE

(75) Inventors: Wen-Tung Chou, Changhua County (TW); Ming-Yi Lai, Changhua County (TW); Kun-Shan Huang, Tainan (TW)

(73) Assignee: ACELON CHEMICAL AND FIBER CORPORATION, Changhua County (TW)

( * ) Notice: Subject to any disclaimer, the term of this patent is extended or adjusted under 35 U.S.C. 154(b) by 662 days.

This patent is subject to a terminal disclaimer.

(21) Appl. No.: 13/414,874

(22) Filed: Mar. 8, 2012

(65) Prior Publication Data
US 2013/0234354 A1   Sep. 12, 2013

(51) Int. Cl.
*D04H 3/11* (2012.01)
*B29C 47/00* (2006.01)
*D01D 10/06* (2006.01)
(Continued)

(52) U.S. Cl.
CPC ............ *B29C 47/0014* (2013.01); *B29C 47/30* (2013.01); *B29C 47/364* (2013.01); *B29C 47/862* (2013.01); *D01D 5/06* (2013.01); *D01D 7/00* (2013.01); *D01D 10/02* (2013.01); *D01D 10/06* (2013.01); *D01F 2/02* (2013.01); *D01F 13/02* (2013.01); *D04H 3/013* (2013.01); *B29C 47/92* (2013.01); *B29C 2947/92704* (2013.01)

(58) Field of Classification Search
CPC ........... D01D 5/06; D01D 7/00; D01D 10/02; D01D 10/06; D01F 1/07; D01F 2/02; D01F 13/02; D04H 3/013; D04H 3/11; D06M 13/282

USPC ........... 264/37.24, 101, 103, 178 F, 180, 187, 264/211, 211.12, 211.14, 211.15, 211.16, 264/211.17, 233, 234, 555
See application file for complete search history.

(56) References Cited

U.S. PATENT DOCUMENTS

| | | |
|---|---|---|
| 4,257,221 A | 3/1981 | Feinberg |
| 4,466,990 A | 8/1984 | Sakurada et al. |

(Continued)

FOREIGN PATENT DOCUMENTS

CN    102127842 A    *    7/2011

*Primary Examiner* — Leo B Tentoni
(74) *Attorney, Agent, or Firm* — Bacon & Thomas, PLLC

(57) ABSTRACT

A Meltblown process for producing non-woven fabrics with flame-retarding capability from natural cellulose comprises following steps. Blend pulp and solvent of N-methylmorpholine N-oxide (NMMO) to form slurry. Evaporate water content from slurry by a Thin Film Evaporator to form dope. Extrude the dope off spinneret bank to form filament bundle via meltblown process. Coagulating regenerate, water rinse, hydro-entangled needle-punch and dry the filament bundle to form normal natural cellulose nonwoven. Soaking roll formed nonwoven by flame retardant of N-(hydroxymethyl)-3-(methoxy phosphorus acyl). Orderly dry, bake, neutralize, soaping clean, water rinse, baking dry, soaking roll, alkaline clean, water rinse, dry and coil the nonwoven to produce modified natural cellulose nonwoven of flame retarding capacity. Because of cross-linking reaction between foregoing flame retardant and natural cellulose nonwoven, the flame-retarding capability thereof meet requirements of testing standards in American ASTM D6413-1999 and ASTM D2863-1995. Moreover, the wastes thereof meet environmental protection requirements.

13 Claims, 4 Drawing Sheets

(51) Int. Cl.
*D04H 3/013* (2012.01)
*D01D 7/00* (2006.01)
*D01D 5/06* (2006.01)
*D01F 2/02* (2006.01)
*D01D 10/02* (2006.01)
*D01F 13/02* (2006.01)
*B29C 47/30* (2006.01)
*B29C 47/36* (2006.01)
*B29C 47/86* (2006.01)
*B29C 47/92* (2006.01)

(56) References Cited

U.S. PATENT DOCUMENTS

| | | | |
|---|---|---|---|
| 6,045,587 A * | 4/2000 | Cheng et al. | 8/116.1 |
| 7,858,005 B2 | 12/2010 | Thole et al. | |
| 7,938,993 B2 * | 5/2011 | Bhushan et al. | 264/37.24 |
| 2002/0060382 A1* | 5/2002 | Luo et al. | 264/555 |
| 2009/0186189 A1* | 7/2009 | White et al. | 264/103 X |

* cited by examiner

MELTBLOWN PROCESS FOR PRODUCING NON-WOVEN FABRICS WITH FLAME-RETARDING CAPABILITY FROM NATURAL CELLULOSE

FIELD OF THE PRESENT INVENTION

The present invention relates to a meltblown process for producing nonwoven fabrics with flame-retarding capability from natural cellulose, which belongs to technical field of eco-friendly fiber process. The process comprises: blend wood pulp and solvent of N-methylmorpholine N-oxide (NMMO) to form into slurry; evaporate slurry to form a spinning dope; spin and extrude dope out of spinnerets to form spinning filaments via meltblown process; water-rinse and dry the spinning filaments to form normal natural cellulose nonwoven; orderly soaking roll, heating dry, bake, neutralize, soaping clean, water rinse, baking dry and successively alkaline clean, water rinse, dry and coil the nonwoven to produce modified natural cellulose nonwoven of long-acting flame retarding capacity.

BACKGROUND OF THE INVENTION

Currently, spunlaid process (also known as polymer laid process) already became a most fast growing technology in the technical field of nonwoven manufacturing process because of advantages of simple process with high economical effect. The spunlaid nonwoven are produced from melted macromolecule polymers through extruding and stretching melted polymers to form continuous filaments as well as stacking laying for web formation so that the nonwoven fabrics of such filaments feature in good physical properties of air permeability and water absorption. Thus, such nonwoven fabrics are prevalently used in application fields of medical, sanitary, wiper, filters and so on.

Wherein, main raw materials of spunlaid process are from polypropylene (PP), polyester (PET), polyethylene (PE) and Nylon in quantity order with overall consumed quantity 96% of global total consumption. According to the survey and statistics of Association of the Nonwoven Fabrics Industry USA, which used to be International Nonwovens & Disposables Association (INDA), the marketing share for the spunlaid nonwoven already leaps from 33.5% in 1994 (second) leaps up to 43.7% in 2009 (first) with total annual yield of 2.7 million tons. However, the wasted spunlaid nonwoven after having been used incurs a malignant impact to natural environment because they are indissoluble or un-degradable by natural environment.

Accordingly, most countries stipulate relevant technical regulations about flammability for textile products in succession so that importing and marketing of such textile products against these technical regulations is prohibited. Moreover, demand of the fireproof or flame retarding nonwoven products is constantly increasing such as industrial nonwoven, household decorating fabric and drapes, which are all required to have rather flame retarding capability so that they can avoid accidents. However, for those spunlaid nonwoven textile products employed polypropylene (PP), polyester (PET), polyethylene (PE) and Nylon as raw materials mentioned above, they all belong to indissoluble or un-degradable fiber. Therefore, their wastes are also indissoluble or un-degradable, which will incur substantially harmful burden to natural environment.

In view of these foregoing facts, how to produce expected nonwoven from natural cellulose fibers, namely dissoluble fiber of degradable feature, with long-acting flame retarding capability via special cross-linking reaction under preset process conditions becomes a critical and urgent demand.

SUMMARY OF THE INVENTION

The primary object is to provide a meltblown process for producing non-woven fabrics with flame-retarding capability from natural cellulose comprising processing steps as below: blend wood pulp with solvent of N-methylmorpholine N-oxide (NMMO) to form into slurry; evaporate extra water content from the prepared slurry by a Thin Film Evaporator (TFE); via meltblown process, the dope is extruded out of a bank of spinneret to form cellulose filament bundle; via ejecting mist aerosol of water, the filament bundle is coagulated for regeneration, then water rinsed, hydro-entangled needle punched and dried to form normal natural cellulose nonwoven; and soaking roll the normal natural cellulose nonwoven by flame retardant of N-(hydroxymethyl)-3-(methoxy phosphorus acyl), then orderly heating dry, bake, neutralize, soaping clean, water rinse and baking dry the soaking rolled natural cellulose nonwoven; and successively alkaline clean, water rinse and dry, to produce modified natural cellulose nonwoven of long-acting flame retarding capacity. Because the cross-linking reaction for the flame retardant of N-(hydroxymethyl)-3-(methoxy phosphorus acyl) with natural cellulose nonwoven during fabricating process, the flame-retarding capability for fabrics made from the natural cellulose nonwoven of the present invention, even after water-rinsing for 20 times, can meet not only strict requirement in the quality control but also the requirements of testing standards in American ASTM D6413-1999 and ASTM D2863-1995. Moreover, the wastes of the natural cellulose nonwoven can be naturally degraded or decomposed to meet the requirements of environment protections.

The other object of the present invention is to provide a meltblown process for producing non-woven fabrics with flame-retarding capability from natural cellulose with a solvent recycling process of N-methylmorpholine N-oxide (NMMO) comprising processing steps of bleaching, filtrating, condensing and refining by simple and effective processing facilities so that aquatic solution processed can be recycled into solvent of N-methylmorpholine N-oxide (NMMO) with quality almost being the same as that of fresh solvent, wherein the consumption rate is controlled down to less of 0.5% while total recycling rate reaches over 99.5%. Thereby, the present invention is not only unable to pollute the environment but also able to reduce the solvent recycling cost so that it has effects in eco-friendly production and resource recycling economy.

DETAILED DESCRIPTION OF THE PREFERRED EMBODIMENTS

For further manifesting procedures in fabricating the present invention, some exemplary preferred embodiments are described below with associated drawing figures.

Figure 2:
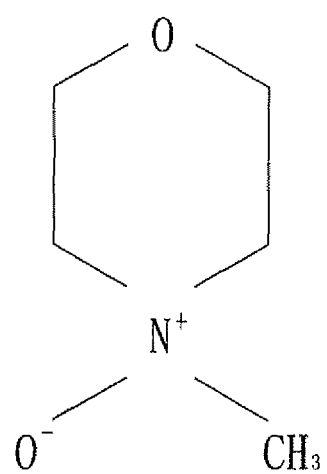
FIG. 2 is a chemical structure of the N-methylmorpholine N-oxide (called NMMO for short) used in the present invention.
Figure 3:
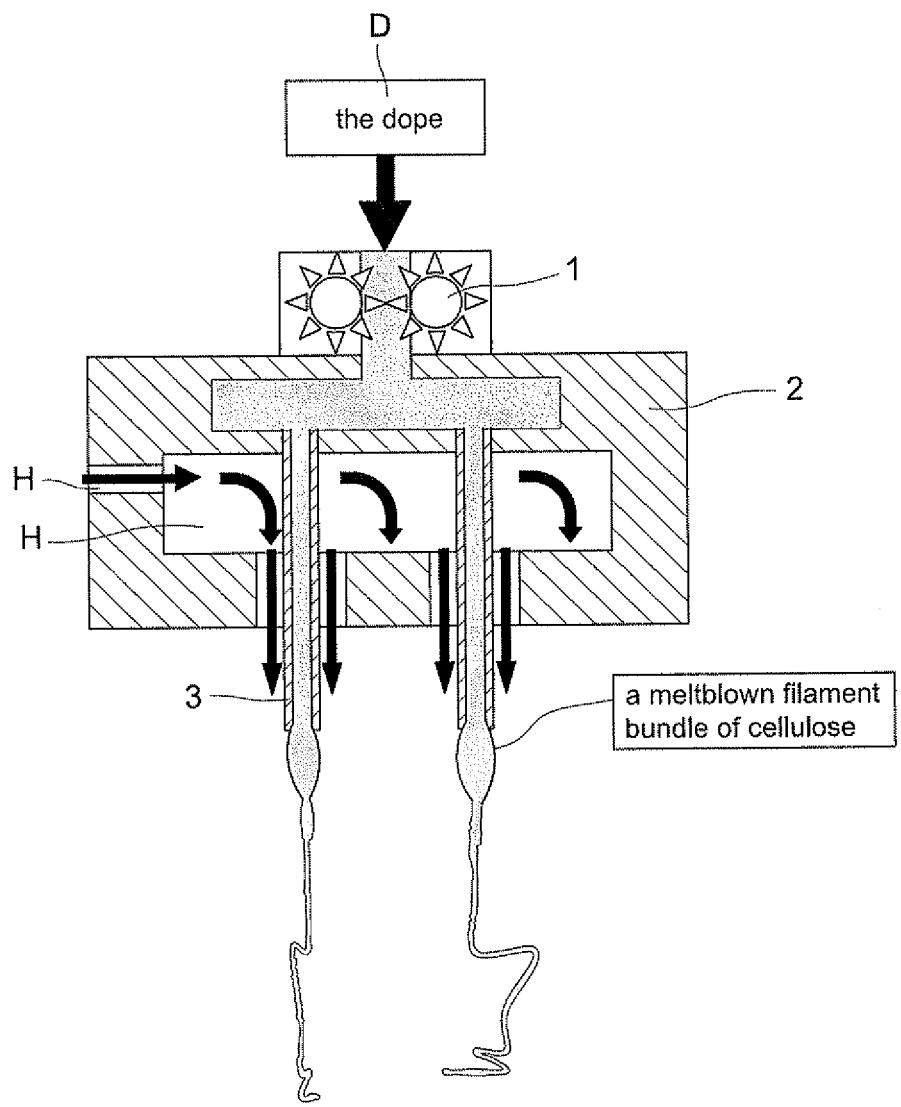
FIG. 3 is an operational view for a meltblown filament bundle of cellulose in the present invention.
Figure 4:
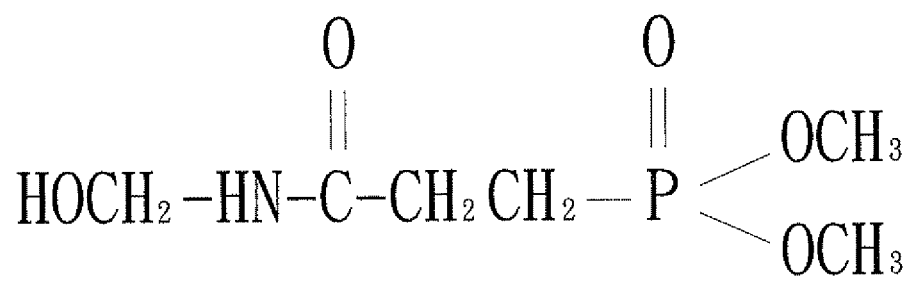
FIG. 4 is a chemical structure of the flame retardant of N-(hydroxymethyl)-3-(methoxy phosphorus acyl) used in the present invention.

Please refer to FIGS. 1 through 4. The meltblown process for producing non-woven fabrics with flame-retarding capability from natural cellulose comprises following processing steps:

(a). Blend raw material of wood pulp and solvent of N-methylmorpholine N-oxide (NMMO) to form into slurry, next additionally mix stabilizer of 1,3-phenylene-bis 2-oxazoline (BOX) into prepared slurry; Then, agitate and crush the slurry of wood pulp, N-methylmorpholine N-oxide (NMMO) and 1,3-phenylene-bis 2-oxazoline (BOX) in a horizontal slurry blending machine by under low temperature in range between 60 degree of Celsius and 80 degree of Celsius (60° C.-80° C.); Wherein, said wood pulp is preferably pulp cellulose of hard wood or soft wood with α-cellulose percentage content being over 85% and degree of polymerization (DP) being in range between 500-1200, and the concentration of the N-methylmorpholine N-oxide (NMMO) is in percentage range between 50%-75% with chemical structure thereof as shown in FIG. 2;

(b). Evaporate extra water content from the prepared slurry by a Thin Film Evaporator (TFE) under temperature in range between 80 degree of Celsius and 120 degree of Celsius (80° C.-120° C.) heating for 5 minutes to remove extra water content so that a spinning dope D is formed with percentage water content of 5%-13%;

(c). By means of meltblown process, the dope D is extruded out of a bank of spinneret 3 to form cellulose filament bundle as shown in FIG. 3, the dope D is fed into a die assembly 2 and forcedly extruded out the spinneret 3 via a gear pump 1 to form filament bundle, wherein certain hot air H is continuously filled in for circulation therein then discharged out via surrounding of the spinneret 3;

(d). By means of ejecting mist aerosol of water, the filament bundle is coagulated for regeneration, after post treatments of water rinsing, hydro-entangled needle punching and drying have been orderly applied, then nonwoven fabrics are produced from natural cellulose, wherein drying temperature is in range between 100 degree of Celsius and 130 degree of Celsius (100° C.-130° C.) heating for time range of 3-5 minutes to form normal natural cellulose nonwoven;

(e). Soaking roll the normal natural cellulose nonwoven by flame retardant of N-(hydroxymethyl)-3-(methoxy phosphorus acyl such that the percentage of rolling liquid is in percentage range between 65%-70% and the concentration of N-(hydroxymethyl)-3-(methoxy phosphorus acyl) is in range between 250-450 grams per liter (g/L) with chemical structure thereof as shown in FIG. 4;

(f). Orderly heating dry, twice bake, neutralize, soaping clean, water rinse and baking dry the soaking rolled natural cellulose nonwoven, wherein the heating dry is performed under temperature at 105 degree of Celsius (105° C.) heating for 10 seconds, first bake is performed under temperature in range between 130 degree of Celsius and 155 degree of Celsius (130° C.-155° C.) heating for time range of 60-120 seconds while second bake is performed under temperature in range between 165 degree of Celsius and 180 degree of Celsius (165° C.-180° C.) heating for time range of 60-120 seconds, the neutralize is performed in an alkaline solution with concentration of 50 grams per liter (g/L) under temperature in range between 20 degree of Celsius and 30 degree of Celsius (20° C.-30° C.), and the soaping clean is performed in an alkaline solution with concentration of 2 grams per liter (g/L) having soaping powder concentration of 3 grams per liter (g/L) under temperature in range between 20 degree of Celsius and 30 degree of Celsius (20° C.-30° C.) for 10 seconds; and (g). Successively alkaline clean, water rinse and dry, then coil the natural cellulose nonwoven from previous step to produce modified natural cellulose nonwoven of long-acting flame retarding capacity, wherein the alkaline clean is performed in an alkaline solution of sodium hydroxide (NaOH) or sodium carbonate (Na.sub.2.CO.sub.3. or $Na_2CO_3$), the coiling speed is in range between 2-200 meters per minute.

Wherein, for the dope D in above step (b), the content percentage of cellulose thereof is in range between 6 wt %-15 wt %, the viscosity thereof is in range between 300-30000 poise, the light transmittance index thereof is in range between 1.470-1.495, and the melting Index thereof is in range between 200-1000.

Moreover, for the natural cellulose nonwoven produced from meltblown process in above step (g), the basis weight thereof is in range between 10-300 grams per meter.sup.2. ($g/m^2$), the fineness of fiber thereof is in range between 1-15 um, the tensile strength in mechanical direction (MD) thereof is over 15 kgf while the tensile strength in cross direction (CD) thereof is over 8 kgf.

For the foregoing step (a) about additionally mixing stabilizer of 1,3-phenylene-bis 2-oxazoline (BOX) into prepared slurry, the stabilizer is formulated in content as 500-2500 PPM of 1,3-phenylene-bis 2-oxazoline (BOX), the stabilizer is blended in the solvent of N-methylmorpholine N-oxide (NMMO), and the stabilizer is mixed with wood pulp to form into slurry. Two key physical properties for different of proportion of mixed stabilizer of 1,3-phenylene-bis 2-oxazoline (BOX) are tabulated as in following Table-A.

TABLE A

| PBOX (ppm) | IXT (470 nm) | RDDP (%) |
|---|---|---|
| 500 | 20.1 | 26.2 |
| 1000 | 15.2 | 20.5 |
| 1500 | 13.8 | 14.7 |
| 2000 | 10.2 | 11.6 |
| 2500 | 9.8 | 11.3 |

Notation
BOX denotes 1,3-phenylene-bis 2-oxazoline (BOX) stabilizer.
PBOX denotes proportion of mixed BOX.
DP denotes degree of polymerization.
IXT denotes index of light transmittance.
RDDP denotes rate of decline for degree of polymerization.

Besides, comparing to conventional stabilizers of sodium hexametaphosphate (SHMP) and n-proply gallate (P.G), the stabilizer of 1,3-phenylene-bis 2-oxazoline (BOX) used in the present invention is less coloring affected in having 470 nm of coloring index with spectrophotometer index of light transmittance from 51.1 down to 10.2 as shown in following Table-B so that not only the refining process of solvent recycling can be simplified but also the unit price thereof is much cheaper than that of foregoing conventional stabilizer SHMP or P.G as shown in Table-C.

TABLE B

| Additive Kind | DP | CC | PMA (ppm) | IXT (470 nm) | RDDP (%) |
|---|---|---|---|---|---|
| AK-1 | 950 | 13.3% | 2000 | 46.8 | 26.1 |
| AK-2 | 950 | 13.3% | 2000 | 51.1 | 26.7 |
| AK-3 | 950 | 13.3% | 2000 | 10.2 | 11.6 |

Notation
AK-1 denotes sodium hexametaphosphate (SHMP) stabilizer.
AK-2 denotes n-proply gallate (P.G.) stabilizer.
AK-3 denotes 1,3-phenylene-bis 2-oxazoline (BOX) stabilizer.
DP denotes degree of polymerization for cellulose.
CC denotes concentration of cellulose.
PMA denotes proportion of mixed additive.
IXT denotes index of light transmittance.
RDDP denotes percentage rate of decline for degree of polymerization.

TABLE C

| Additive Kind | UP | PMA (ppm) | Conventional | | Present Invention (Unit: NT$/Kg) | |
|---|---|---|---|---|---|---|
| | | | CSV | Total | CSV | Total |
| AK-1 | 1000.00 | 2000 | 270.00 | 270.27 | 195.00 | 195.27 |
| AK-2 | 28000.00 | 2000 | 270.00 | 277.50 | 195.00 | 202.50 |
| AK-3 | 960.00 | 2000 | — | — | 195.00 | 195.26 |

Notation
AK-1 denotes sodium hexametaphosphate (SHMP) stabilizer.
AK-2 denotes n-proply gallate (P.G.) stabilizer.
AK-3 denotes 1,3-phenylene-bis 2-oxazoline (BOX) stabilizer.
UP denotes unit price.
PMA denotes proportion of mixed additive.
CSV denotes cost of solvent.

Figure 1:
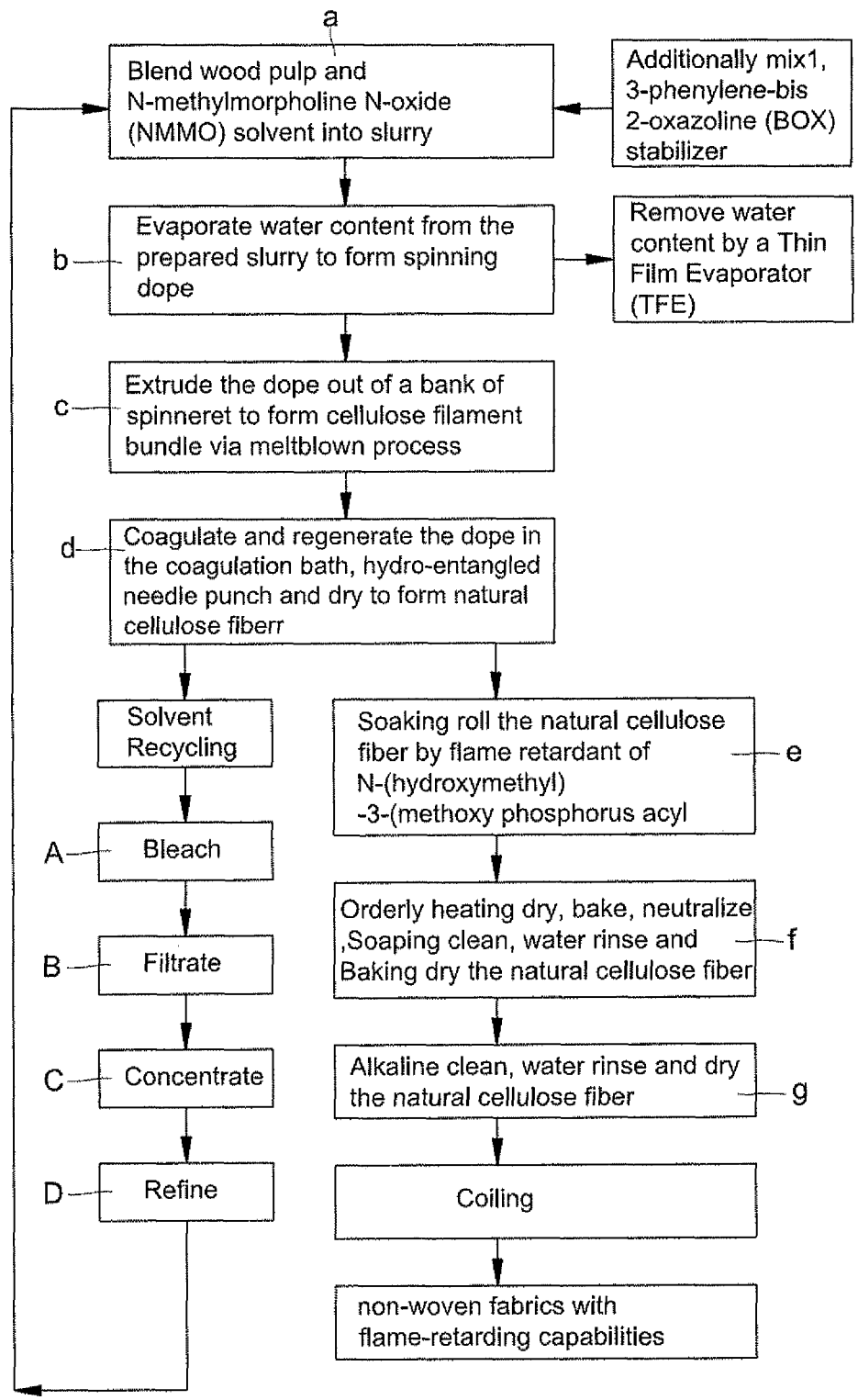
FIG. 1 is a flow chart of block diagram showing the fabricating process of the present invention.

Besides, the key solvent of N-methylmorpholine N-oxide (NMMO) used in the present invention will be released out during processes of the regenerating and water-rinsing of step (d) in great quantity, which should be collected for recycling so as to amply reuse in recurring manner as the recovery rate will significantly affect the integral process cost. As shown in FIG. 1, the solvent recycling process of N-methylmorpholine N-oxide (NMMO) comprises following steps:

A. Bleaching:

The bleaching process of the present invention is performed by absorption of suspending active carbon with practical steps as below: put active carbon powder with good absorptivity and suspension ability in percentage range of 0.05%-0.10% into the liquid of NMMO solvent to be decolored, then alternate the air-blast mixing with absorption and the stationary suspending absorption treatments with treating time ratio in range between 1:3 to 1:6 for over 8 hours to finish the bleaching procedure so that the advantages of the decolorizing process of the present invention have effects in simplifying process facilities, saving energy and enhancing effect of absorbing decolorization.

B. Filtrating:

The filtrating process of the present invention is performed by bi-phase filtration of coarse filtering phase and fine filtering phase. First coarse filtering phase: for simplifying the processing facility, general cartridge filter is used with filter aid composing of diatomite and cellulose preferably made of diatomite to cellulose in ratio of 4:1. In order to avoid hindering filtrating speed incurred by active carbon from gradually accumulating on the surface of the filtering cartridge, a filter aid not only spreads over the surface of the filtering cartridge but also is put in the solution to be filtrated with content thereof in percentage range between 0.03%-0.05%. Besides, minor puffing agent is also mixed therein to enhance filtrating speed without degeneracy. After completion of the coarse filtering phase, the filtering dregs and the residual liquid are centrifugal and dehydrating treated for recycling use so that the residual auxiliary filtering agent of dehydrated filter aid can be reused as auxiliary filtering effect being remained. Second fine filtering phase: Ultrafiltration (UF) filter is used so that the cleanness of the filtrated liquid is the same as that of the fresh solvent. The advantages of the bi-phase filtrating process of the present invention are low cost of process facilities, low ratio of consumption rate, high throughput and high cleanness.

C. Concentrating:

In recovering the water rinsing liquid in the present invention, the condensing load in dehydration is very large in manner of approximately 90 tons per ton of fiber as solvent concentration must be condensed from in percentage range between 6.5%-8.0% down to in percentage range between 50%-55%. For low yield quantity of fiber, a tri-effect condensing method is adopted to dehydrate per ton of rinsing liquid in using 0.5 ton of steam (high steam consumption but low electric power consumption) while for high yield quantity of fiber, a Mechanical Vapor Recompression (MVR) condensing method is adopted to dehydrate per ton of rinsing liquid in using quantity range between 0.003-0.03 ton of steam (low steam consumption but high electric power consumption). The yield condensed liquid with solvent and condensed water in both foregoing condensing methods can also be completely recovered for reusing though each condensing method is only suitable for different specific yield quantity of fiber. Wherein, the yield condensed liquid with solvent can be recycled for reusing as processing solvent and yield condensed water can be recycled for reusing to rinse fiber.

D. Refining:

Adopting temperature at 80 degree of Celsius (80° C.) low temperature oxidation and neutralizing reduction. Using percentage concentration in 35% of hydrogen peroxide ($H_2O_2$ or $H_2O_2$) as oxidant and percentage concentration in 85% of hydrazine hydrate ($N_2H_4H_2O$ or $N_2H_4H_2O$) as neutralizing reductant. The result is measured by electric potential titrating method. The NMMO content can be decreased down below 10 ppm so that not only the purity of NMMO can be promoted but also the NMMO consumption can be decreased.

For expedite you to further understand the features and efficacy of the present invention, various item tests for the exemplary embodiments are described in detail as below.

Embodiment 1

Specimens in Number D1-D12 and F1-F12

Blend cellulose of wood pulp in degree of polymerization (DP) of 650 with solvent of N-methylmorpholine N-oxide (NMMO) to form into slurry, next additionally mix stabilizer of 1,3-phenylene-bis 2-oxazoline (BOX) and anti-decline additive for degree of polymerization (DP) in respectively different mixed proportion into prepared slurry. Then, evaporate extra water content from the prepared slurry by a Thin Film Evaporator (TFE) under temperature in range between 80 degree of Celsius and 120 degree of Celsius (80° C.-120° C.) heating for 5 minutes to remove extra water content so that a spinning dope is formed with water percentage content in range between 5%-13%. The composition table of dope for different specimens indicated D1-D6 is shown in Table-1. By meltblown process, the dope is extruded out of a bank of spinneret to form cellulose filament bundle; By means of ejecting mist aerosol of water, the filament bundle is coagulated for regeneration, after post treatments of water rinsing, hydro-entangled needle punching and drying have been orderly applied, then normal natural cellulose nonwoven fabrics are produced from natural cellulose; Soaking roll the normal natural cellulose nonwoven by flame retardant of N-(hydroxymethyl)-3-(methoxy phosphorus acyl) such that the percentage of rolling liquid is in percentage range between 65%-70% and the concentration of N-(hydroxymethyl)-3-(methoxy phosphorus acyl) is in range between 0-450 grams per liter (g/L); Orderly neutralize, soaping clean, water rinse and baking dry the natural cellulose nonwoven previously soaking rolled, wherein the bake is performed at temperature 180 degree of Celsius (180° C.) for 240 seconds, and successively alkaline clean, water rinse, dry and oil the natural cellulose nonwoven to produce modified natural cellulose nonwoven of long-acting flame retarding capacity via winding up in coil manner. For physical properties in specimens of natural cellulose nonwovens produced are indicated by specimen number F1-F6 shown in Table-2.

Embodiment 2

Specimens in Number D1-D12 and F1-F12

Blend cellulose of wood pulp in degree of polymerization (DP) of 1050 with solvent of N-methylmorpholine N-oxide (NMMO) to form into slurry, next additionally mix stabilizer of 1,3-phenylene-bis 2-oxazoline (BOX) and anti-decline additive for degree of polymerization (DP) in respectively different mixed proportion into prepared slurry. Then, evaporate extra water content from the prepared slurry by a Thin Film Evaporator (TFE) under temperature in range between 80 degree of Celsius and 120 degree of Celsius (80° C.-120° C.) heating for 5 minutes to remove extra water content so that a spinning dope is formed with water percentage content in range between 5%-13%. The composition table of dope for different specimens indicated D1-D12 is shown in Table-1. By meltblown process, the dope is extruded out of a bank of spinneret to form cellulose filament bundle; By means of ejecting mist aerosol of water, the filament bundle is coagulated for regeneration, after post treatments of water rinsing, hydro-entangled needle punching and drying have been orderly applied, then normal natural cellulose nonwoven fabrics are produced from natural cellulose; Soaking roll the normal natural cellulose nonwoven by flame retardant of N-(hydroxymethyl)-3-(methoxy phosphorus acyl) such that the percentage of rolling liquid is in percentage range between 65%-70% and the concentration of N-(hydroxymethyl)-3-(methoxy phosphorus acyl) is in range between 0-450 grams per liter (g/L); Orderly neutralize, soaping clean, water rinse and baking dry the natural cellulose nonwoven previously soaking rolled, wherein the bake is performed at temperature 180 degree of Celsius (180° C.) for 240 seconds, and successively alkaline clean, water rinse, dry and oil the natural cellulose nonwoven to produce modified natural cellulose nonwoven of long-acting flame retarding capacity via winding up in coil manner. For physical properties in specimens of foregoing natural cellulose nonwovens produced are indicated by specimen number F1-F12 shown in Table-2.

TABLE 1

Composition of dope for different specimens

| NOS | DP | PM-ADDP (Wt %) | RDDP | CC | SC | WC | DV | IXT | IXM |
|---|---|---|---|---|---|---|---|---|---|
| D1 | 650 | 0.05% | 26.2 | 7.6 | 81.3 | 11.1 | 840 | 1.489 | 870 |
| D2 | 650 | 0.10% | 20.5 | 8.5 | 81.9 | 9.6 | 980 | 1.482 | 820 |
| D3 | 650 | 0.15% | 14.7 | 9.1 | 81.2 | 9.7 | 1240 | 1.486 | 810 |
| D4 | 650 | 0.20% | 11.6 | 8.5 | 82.0 | 9.5 | 1060 | 1.481 | 820 |
| D5 | 650 | 0.25% | 11.3 | 8.2 | 81.8 | 10.0 | 960 | 1.485 | 830 |
| D6 | 650 | 0.30% | 11.2 | 8.3 | 81.5 | 10.2 | 1010 | 1.491 | 810 |
| D7 | 1050 | 0.05% | 26.5 | 7.8 | 81.8 | 10.4 | 1240 | 1.481 | 750 |
| D8 | 1050 | 0.10% | 21.7 | 7.5 | 81.1 | 11.4 | 1560 | 1.480 | 720 |
| D9 | 1050 | 0.15% | 15.9 | 9.1 | 82.1 | 8.8 | 1420 | 1.482 | 700 |
| D10 | 1050 | 0.20% | 13.8 | 8.2 | 82.0 | 9.8 | 1280 | 1.476 | 740 |
| D11 | 1050 | 0.25% | 12.1 | 7.9 | 81.0 | 11.1 | 1320 | 1.479 | 710 |
| D12 | 1050 | 0.30% | 11.8 | 8.0 | 81.5 | 10.5 | 1210 | 1.488 | 730 |

Notation
NOS denote assigned numbers of specimens.
DP denotes degree of polymerization for cellulose.
PM-ADDP denotes proportion of mixed anti-decline additive for degree of polymerization.
RDDP denotes rate of decline for degree of polymerization.
CC denotes content of cellulose.
SC denotes content of solvent.
WC denotes content of water.
PMS denotes proportion of mixed stabilizer.
DV denotes viscosity of dope.
IXT denotes index of light transmittance for dope.
IXM denotes melting Index of dope.

TABLE 2

Physical properties of natural cellulose nonwoven treated by flame retardants of different concentration

| Specimen | DP | CFR (g/L) | BW (g/m²) | TS-MD (kgf) | TS-CD (kgf) | FF (µm) |
|---|---|---|---|---|---|---|
| F1 | 650 | 0 | 75 | 15.1 | 8.3 | 3.2 |
| F2 | 650 | 100 | 76 | 16.0 | 8.9 | 3.8 |
| F3 | 650 | 200 | 75 | 16.1 | 8.2 | 3.5 |
| F4 | 650 | 300 | 74 | 16.0 | 8.0 | 3.5 |
| F5 | 650 | 400 | 75 | 15.5 | 8.8 | 3.7 |
| F6 | 650 | 450 | 75 | 15.6 | 8.2 | 3.4 |
| F7 | 1050 | 0 | 75 | 15.8 | 8.8 | 4.5 |
| F8 | 1050 | 100 | 74 | 15.2 | 9.1 | 4.8 |
| F9 | 1050 | 200 | 76 | 16.7 | 9.4 | 4.2 |
| F10 | 1050 | 300 | 75 | 16.2 | 9.5 | 4.9 |
| F11 | 1050 | 400 | 75 | 16.1 | 9.5 | 5.2 |
| F12 | 1050 | 450 | 76 | 16.3 | 8.9 | 4.3 |

Notation
DP denotes degree of polymerization for cellulose.
CFR denotes concentration of flame retardant.
BW denotes basis weight of nonwoven.
TS-MD denotes tensile strength in mechanical direction (MD) of nonwoven.
TS-CD denotes tensile strength in cross direction (CD) of nonwoven.
FF denotes fineness of fiber.

Embodiment 3

Test for Flame Retarding Capability

Blend cellulose of wood pulp in degree of polymerization (DP) of 650 and 1050 with solvent of N-methylmorpholine N-oxide (NMMO) to form into slurry, next additionally mix stabilizer of 1,3-phenylene-bis 2-oxazoline (BOX) and anti-decline additive for degree of polymerization (DP) in respectively different mixed proportion into prepared slurry. Then, evaporate extra water content from the prepared slurry by a Thin Film Evaporator (TFE) under temperature in range between 80 degree of Celsius and 120 degree of Celsius (80° C.-120° C.) heating for 5 minutes to remove extra water content so that a spinning dope is formed with water percentage content in range between 5%-13%. By meltblown process, the dope is extruded out of a bank of spinneret to form cellulose filament bundle; By means of ejecting mist aerosol of water, the filament bundle is coagulated for regeneration, after post treatments of water rinsing, hydro-entangled needle punching and drying have been orderly applied, then normal natural cellulose nonwoven fabrics are produced from natural cellulose; Soaking roll the normal natural cellulose nonwoven by flame retardant of N-(hydroxymethyl)-3-(methoxy phosphorus acyl) such that the percentage of rolling liquid is in percentage range between 65%-70% and the concentration of N-(hydroxymethyl)-3-(methoxy phosphorus acyl) is in range between 0-450 grams per liter (g/L); Orderly neutralize, soaping clean, water rinse and baking dry the natural cellulose nonwoven previously soaking rolled, wherein the bake is performed at temperature 180 degree of Celsius (180° C.) for 240 seconds, and successively alkaline clean, water rinse, dry and oil the natural cellulose nonwoven to produce modified natural cellulose nonwoven of long-acting flame retarding capacity via winding up in coil manner. All related items of flame retarding capability for specimens of foregoing natural cellulose nonwovens produced are tested in accordance with American ASTM D6413-1999 testing standards.

A vertical burning method, which is adopted for the test of flame retarding capability, comprises following steps. Firstly, respectively weave each specimen of all F1-F12 nonwoven specimens into three pieces of sample such that each piece of sample is dimensioned in 1.5 cm×24.5 cm, secondly, fix each piece of sample on a fireproof test apparatus such that the distance between the lower end of each piece of sample and burner mouth of the fireproof test apparatus is 19 mm, thirdly, adjust burner flame of the fireproof test apparatus at height of 38 mm to perform test of flame retarding capability for 12 seconds, fourthly, remove away the burner flame of the fireproof test apparatus and meanwhile press the start button of a stopwatch for starting time count, fifthly, upon all remaining ash (ember) on the testing sample is completely extinguished, press the stop button of the stopwatch for stopping time count, and finally, record each continual time of remaining flame and each time of remaining ash (ember).

The measurement in distance of carbonization comprises following steps. Remove away each piece of sample from the fireproof test apparatus after having finished foregoing test of flame retarding capability, next fold each piece of sample and press down at one lower side of the folded sample a hammer-like weight with area thereof corresponding to that of the folded sample, then hold the other lower side of the folded sample and turn it upside down, and test disconnecting distance for each piece of sample. All testing results obtained in foregoing various tests for specimens are shown in Table-3 with specimen number of F1-F12 indicated and Table-4 with specimen number of T1-T12 indicated.

TABLE 3

Flame retarding test of natural cellulose nonwoven treated by different concentration of flame retardants but under same baking temperature at 180 degree of Celsius (180° C.) and same baking time of 240 seconds

| Specimen | DP | CFR (g/L) | TRF (second) | TRA (second) | DC (mm) | TE (Yes/No) |
|---|---|---|---|---|---|---|
| F1 | 650 | 0 | >30 | >30 | >200 | No |
| F2 | 650 | 100 | >1 | >2 | >100 | No |
| F3 | 650 | 200 | 0 | 0.3 | 52 | slight |
| F4 | 650 | 300 | 0 | 0.1 | 49 | Yes |
| F5 | 650 | 400 | 0 | 0 | 47 | Yes |
| F6 | 650 | 450 | 0 | 0 | 45 | Yes |
| F7 | 1050 | 0 | >30 | >30 | >200 | No |
| F8 | 1050 | 100 | >1 | >2 | >100 | No |
| F9 | 1050 | 200 | 0 | 0.3 | 54 | slight |
| F10 | 1050 | 300 | 0 | 0.1 | 49 | Yes |
| F11 | 1050 | 400 | 0 | 0 | 47 | Yes |
| F12 | 1050 | 450 | 0 | 0 | 45 | Yes |

Notation
DP denotes degree of polymerization for cellulose.
CFR denotes concentration of flame retardant.
TRF denotes time of remaining flame.
TRA denotes time of remaining ash (ember).
DC denotes distance of carbonization for fiber.
TE denotes effect of test.

TABLE 4

Flame retarding test of natural cellulose nonwoven treated by same concentration in 450 g/L of flame retardants but under different baking temperature and different baking time

| specimen | DP | BTE (° C.) | BTM (sec.) | TRF (sec.) | TRA (sec.) | DC (mm) | TE (Yes/No) |
|---|---|---|---|---|---|---|---|
| T1 | 650 | 140 | 240 | >1 | >2 | >100 | No |
| T2 | 650 | 160 | 240 | 0 | >1 | >75 | slight |
| T3 | 650 | 180 | 120 | 0 | 0.5 | 60 | Yes |
| T4 | 650 | 180 | 160 | 0 | 0.2 | 50 | Yes |
| T5 | 650 | 180 | 200 | 0 | 0 | 49 | Yes |
| T6 | 650 | 180 | 240 | 0 | 0 | 45 | Yes |
| T7 | 1050 | 140 | 240 | >1 | >2 | >100 | No |
| T8 | 1050 | 160 | 240 | 0 | >1 | >75 | slight |
| T9 | 1050 | 180 | 120 | 0 | 0.5 | 60 | Yes |
| T10 | 1050 | 180 | 160 | 0 | 0.2 | 50 | Yes |
| T11 | 1050 | 180 | 200 | 0 | 0 | 48 | Yes |
| T12 | 1050 | 180 | 240 | 0 | 0 | 45 | Yes |

Notation
DP denotes degree of polymerization for cellulose.
BTE denotes baking temperature.
BTM denotes baking time.
TRF denotes time of remaining flame.
TRA denotes time of remaining ash (ember).
DC denotes distance of carbonization for fiber.
TE denotes effect of test.

Embodiment 4

Test for Flame Retarding Capability at Limit of Oxygen Index (L.O.I)

Blend cellulose of wood pulp in degree of polymerization (DP) of 650 and 1050 with solvent of N-methylmorpholine N-oxide (NMMO) to form into slurry, next additionally mix stabilizer of 1,3-phenylene-bis 2-oxazoline (BOX) and anti-decline additive for degree of polymerization (DP) in respectively different mixed proportion into prepared slurry. Then, evaporate extra water content from the prepared slurry by a Thin Film Evaporator (TFE) under temperature in range between 80 degree of Celsius and 120 degree of Celsius (80° C.-120° C.) heating for 5 minutes to remove extra water content so that a spinning dope is formed with water percentage content in range between 5%-13%. By meltblown process, the dope is extruded out of a bank of spinneret to form cellulose filament bundle; By means of ejecting mist aerosol of water, the filament bundle is coagulated for regeneration, after post treatments of water rinsing, hydro-entangled needle punching and drying have been orderly applied, then normal natural cellulose nonwoven fabrics are produced from natural cellulose; Soaking roll the normal natural cellulose nonwoven by flame retardant of N-(hydroxymethyl)-3-(methoxy phosphorus acyl) such that the percentage of rolling liquid is in percentage range between 65%-70% and the concentration of N-(hydroxymethyl)-3-(methoxy phosphorus acyl) is in range between 0-450 grains per liter (g/L); Orderly neutralize, soaping clean, water rinse and baking dry the natural cellulose nonwoven previously soaking rolled, wherein the bake is performed at temperature 180 degree of Celsius (180° C.) for 240 seconds, and successively alkaline clean, water rinse, dry and oil the natural cellulose nonwoven to produce modified natural cellulose nonwoven of long-acting flame retarding capacity via winding up in coil manner. All related items of flame retarding capability at Limit of Oxygen Index (L.O.I) for specimens of foregoing natural cellulose nonwovens produced are tested in accordance with American ASTM D2863-1995 testing standards.

The value of the Limit of Oxygen Index (L.O.I) is defined as minimal oxygen concentration required for keeping testing specimen of fiber or fabric in sustainable burning in a burning cylinder. The calculating formula thereof is expressed as below.

$$LOI = \frac{O_2}{O_2 + N_2} \times 100\%$$

The higher value of the Limit of Oxygen Index (L.O.I) means higher oxygen concentration is required for keeping testing specimen of fiber or fabric in sustainable burning in a burning cylinder. In other wards, the testing specimen is more difficult to burn.

All testing results obtained in foregoing various tests for specimens are shown in Table-5 with specimen number of F1-F12 indicated and Table-6 with specimen number of T1-T12 indicated.

TABLE 5

Flame retarding test of natural cellulose nonwoven treated by different concentration of flame retardants and different Limits of Oxygen Index (L.O.I) but under same baking temperature at 180 degree of Celsius (180° C.) and same baking time of 240 seconds.

| Specimen | DP | CFR (g/L) | L.O.I | TE (Yes/No) |
|---|---|---|---|---|
| F1 | 650 | 0 | 17 | No |
| F2 | 650 | 100 | 22 | No |
| F3 | 650 | 200 | 26 | slight |
| F4 | 650 | 300 | 32 | Yes |
| F5 | 650 | 400 | 34 | Yes |
| F6 | 650 | 450 | 38 | Yes |
| F7 | 1050 | 0 | 17 | No |
| F8 | 1050 | 100 | 22 | No |
| F9 | 1050 | 200 | 26 | slight |
| F10 | 1050 | 300 | 32 | Yes |
| F11 | 1050 | 400 | 35 | Yes |
| F12 | 1050 | 450 | 38 | Yes |

Notation
DP denotes degree of polymerization for cellulose.
CFR denotes concentration of flame retardant.
L.O.I denotes limit of oxygen index (L.O.I).
TE denotes effect of test.

TABLE 6

Flame retarding test of natural cellulose nonwoven treated by same concentration in 450 g/L of flame retardants but different Limit of Oxygen Index (L.O.I) and under different baking temperature and different baking time.

| Specimen | DP | BTE (° C.) | BTM (second) | L.O.I | TE (Yes/No) |
|---|---|---|---|---|---|
| T1 | 650 | 140 | 240 | 21 | No |
| T2 | 650 | 160 | 240 | 22 | slight |
| T3 | 650 | 180 | 120 | 25 | slight |
| T4 | 650 | 180 | 160 | 28 | Yes |
| T5 | 650 | 180 | 200 | 32 | Yes |
| T6 | 650 | 180 | 240 | 36 | Yes |
| T7 | 1050 | 140 | 240 | 21 | No |
| T8 | 1050 | 160 | 240 | 22 | slight |
| T9 | 1050 | 180 | 120 | 25 | slight |
| T10 | 1050 | 180 | 160 | 28 | Yes |
| T11 | 1050 | 180 | 200 | 32 | Yes |
| T12 | 1050 | 180 | 240 | 36 | Yes |

Notation
DP denotes degree of polymerization for cellulose.
BTE denotes baking temperature.
BTM denotes baking time.
L.O.I denotes limit of oxygen index (L.O.I).
DC denotes distance of carbonization for fiber.
TE denotes effect of test.

Embodiment 5

Test for Flame Retarding Capability after Water Rinsing for 20 Times

Blend cellulose of wood pulp in degree of polymerization (DP) of 650 and 1050 with solvent of N-methylmorpholine N-oxide (NMMO) to form into slurry, next additionally mix stabilizer of 1,3-phenylene-bis 2-oxazoline (BOX) and anti-decline additive for degree of polymerization (DP) in respectively different mixed proportion into prepared slurry. Then, evaporate extra water content from the prepared slurry by a Thin Film Evaporator (TFE) under temperature in range between 80 degree of Celsius and 120 degree of Celsius (80° C.-120° C.) heating for 5 minutes to remove extra water content so that a spinning dope is formed with water percentage content in range between 5%-13%. By meltblown process, the dope is extruded out of a bank of spinneret to form cellulose filament bundle; By means of ejecting mist aerosol of water, the filament bundle is coagulated for regeneration, after post treatments of water rinsing, hydro-entangled needle punching and drying have been orderly applied, then normal natural cellulose nonwoven fabrics are produced from natural cellulose; Soaking roll the normal natural cellulose nonwoven by flame retardant of N-(hydroxymethyl)-3-(methoxy phosphorus acyl) such that the percentage of rolling liquid is in percentage range between 65%-70% and the concentration of N-(hydroxymethyl)-3-(methoxy phosphorus acyl) is in range between 0-450 grams per liter (g/L); Orderly neutralize, soaping clean, water rinse and baking dry the natural cellulose nonwoven previously soaking rolled, wherein the bake is performed at temperature 180 degree of Celsius (180° C.) for 240 seconds, and successively alkaline clean, water rinse, dry and oil the natural cellulose nonwoven to produce modified natural cellulose nonwoven of long-acting flame retarding capacity via winding up in coil manner. For specimens of foregoing natural cellulose nonwovens produced, they have to be firstly water rinsed for 20 times in accordance with AATCC 135-2004 Option 1 (2)v1 A(i) 4Lb Load water rinsing method, then all related items of flame retarding capability thereof are tested in accordance with American ASTM D6413-1999 testing standards. All testing results obtained in foregoing various tests for specimens are shown in Table-7 with specimen number of F1-F12 indicated and Table-8 with specimen number of T1-T12 indicated.

TABLE 7

Flame retarding test of natural cellulose nonwoven treated by different concentration of flame retardants but under same baking temperature at 180 degree of Celsius (180° C.) and same baking time of 240 seconds then water rinsed for 20 times.

| Specimen | DP | CFR (g/L) | TRF (sec.) | TRA (sec.) | DC (mm) | TE (Yes/No) |
|---|---|---|---|---|---|---|
| F1 | 650 | 0 | >30 | >30 | >200 | No |
| F2 | 650 | 100 | >1 | >2 | >100 | No |
| F3 | 650 | 200 | 0 | 0.3 | 57 | slight |
| F4 | 650 | 300 | 0 | 0.1 | 50 | Yes |
| F5 | 650 | 400 | 0 | 0 | 49 | Yes |
| F6 | 650 | 450 | 0 | 0 | 48 | Yes |
| F7 | 1050 | 0 | >30 | >30 | >200 | No |
| F8 | 1050 | 100 | >1 | >2 | >100 | No |
| F9 | 1050 | 200 | 0 | 0.3 | 55 | slight |
| F10 | 1050 | 300 | 0 | 0.1 | 51 | Yes |

TABLE 7-continued

Flame retarding test of natural cellulose nonwoven treated by different concentration of flame retardants but under same baking temperature at 180 degree of Celsius (180° C.) and same baking time of 240 seconds then water rinsed for 20 times.

| Specimen | DP | CFR (g/L) | TRF (sec.) | TRA (sec.) | DC (mm) | TE (Yes/No) |
|---|---|---|---|---|---|---|
| F11 | 1050 | 400 | 0 | 0 | 49 | Yes |
| F12 | 1050 | 450 | 0 | 0 | 46 | Yes |

Notation
DP denotes degree of polymerization for cellulose.
CFR denotes concentration of flame retardant.
TRF denotes time of remaining flame.
TRA denotes time of remaining ash (ember).
DC denotes distance of carbonization for fiber.
TE denotes effect of test.

TABLE 8

Flame retarding test of natural cellulose nonwoven treated by same concentration in 450 g/L of flame retardants but under different baking temperature and different baking time then water rinsed for 20 times.

| Specimen | DP | BTE (° C.) | BTM (sec) | TRF (sec) | TRA (sec) | DC (mm) | TE (Yes/No) |
|---|---|---|---|---|---|---|---|
| T1 | 650 | 140 | 240 | >5 | >10 | >150 | No |
| T2 | 650 | 160 | 240 | >1 | >2 | >100 | No |
| T3 | 650 | 180 | 120 | 0 | 0.5 | 65 | slight |
| T4 | 650 | 180 | 160 | 0 | 0.2 | 52 | Yes |
| T5 | 650 | 180 | 200 | 0 | 0 | 50 | Yes |
| T6 | 650 | 180 | 240 | 0 | 0 | 48 | Yes |
| T7 | 1050 | 140 | 240 | >5 | >10 | >150 | No |
| T8 | 1050 | 160 | 240 | >1 | >2 | >100 | No |
| T9 | 1050 | 180 | 120 | 0 | 0.5 | 62 | slight |
| T10 | 1050 | 180 | 160 | 0 | 0.2 | 52 | Yes |
| T11 | 1050 | 180 | 200 | 0 | 0 | 50 | Yes |
| T12 | 1050 | 180 | 240 | 0 | 0 | 46 | Yes |

Notation
DP denotes degree of polymerization for cellulose.
BTE denotes baking temperature.
BTM denotes baking time.
TRF denotes time of remaining flame.
TRA denotes time of remaining ash (ember).
DC denotes distance of carbonization for fiber.
TE denotes effect of test.

Embodiment 6

Test for Flame Retarding Capability at Limit of Oxygen Index (L.O.I) after Water Rinsing for 20 Times)

Blend cellulose of wood pulp in degree of polymerization (DP) of 650 and 1050 with solvent of N-methylmorpholine N-oxide (NMMO) to form into slurry, next additionally mix stabilizer of 1,3-phenylene-bis 2-oxazoline (BOX) and anti-decline additive for degree of polymerization (DP) in respectively different mixed proportion into prepared slurry. Then, evaporate extra water content from the prepared slurry by a Thin Film Evaporator (TFE) under temperature in range between 80 degree of Celsius and 120 degree of Celsius (80° C.-120° C.) heating for 5 minutes to remove extra water content so that a spinning dope is formed with water percentage content in range between 5%-13%. By meltblown process, the dope is extruded out of a bank of spinneret to form cellulose filament bundle; By means of ejecting mist aerosol of water, the filament bundle is coagulated for regeneration, after post treatments of water rinsing, hydro-entangled needle punching and drying have been orderly applied, then normal natural cellulose nonwoven fabrics are produced from natural cellulose; Soaking roll the normal natural cellulose nonwoven by flame retardant of N-(hydroxymethyl)-3-(methoxy phosphorus acyl) such that the percentage of rolling liquid is in percentage range between 65%-70% and the concentration of N-(hydroxymethyl)-3-(methoxy phosphorus acyl) is in range between 0-450 grams per liter (g/L); Orderly neutralize, soaping clean, water rinse and baking dry the natural cellulose nonwoven previously soaking rolled, wherein the bake is performed at temperature 180 degree of Celsius (180° C.) for 240 seconds, and successively alkaline clean, water rinse, dry and oil the natural cellulose nonwoven to produce modified natural cellulose nonwoven of long-acting flame retarding capacity via winding up in coil manner. For specimens of foregoing natural cellulose nonwovens produced, they have to be firstly water rinsed for 20 times in accordance with AATCC 135-2004 Option 1 (2)v1 A(i) 4Lb Load water rinsing method, then all related items of flame retarding capability at Limit of Oxygen Index (L.O.I) thereof are tested in accordance with American ASTM D2863-1995 testing standards. All testing results obtained in foregoing various tests for specimens are shown in Table-9 with specimen number of F1-F12 indicated and Table-10 with specimen number of T1-T12 indicated.

TABLE 9

Flame retarding test of natural cellulose nonwoven treated by different concentration of flame retardants and different Limit of Oxygen Index (L.O.I) after 20 times of water rinsing but under same baking temperature at 180 degree of Celsius (180° C.) and same baking time of 240 seconds.

| Specimen | DP | CFR (g/L) | WR-L.O.I | TE (Yes/No) |
|---|---|---|---|---|
| F1 | 650 | 0 | 15 | No |
| F2 | 650 | 100 | 21 | No |
| F3 | 650 | 200 | 26 | slight |
| F4 | 650 | 300 | 31 | Yes |
| F5 | 650 | 400 | 35 | Yes |
| F6 | 650 | 450 | 36 | Yes |
| F7 | 1050 | 0 | 15 | No |
| F8 | 1050 | 100 | 21 | No |
| F9 | 1050 | 200 | 26 | slight |
| F10 | 1050 | 300 | 31 | Yes |
| F11 | 1050 | 400 | 35 | Yes |
| F12 | 1050 | 450 | 36 | Yes |

Notation
DP denotes degree of polymerization for cellulose.
CFR denotes concentration of flame retardant.
WR-L.O.I denotes limit of oxygen index (L.O.I) after 20 times of water rinsing.
TE denotes effect of test.

TABLE 10

Flame retarding test of natural cellulose nonwoven treated by same concentration in 450 g/L of flame retardants but different Limit of Oxygen Index (L.O.I) after 20 times of water rinsing and under different baking temperature and different baking time.

| Specimen | DP | BTE (° C.) | BTM (second) | WR-L.O.I | TE (Yes/No) |
|---|---|---|---|---|---|
| T1 | 650 | 140 | 240 | 21 | No |
| T2 | 650 | 160 | 240 | 22 | slight |
| T3 | 650 | 180 | 120 | 25 | slight |
| T4 | 650 | 180 | 160 | 28 | Yes |
| T5 | 650 | 180 | 200 | 32 | Yes |
| T6 | 650 | 180 | 240 | 36 | Yes |
| T7 | 1050 | 140 | 240 | 21 | No |
| T8 | 1050 | 160 | 240 | 22 | slight |

TABLE 10-continued

Flame retarding test of natural cellulose nonwoven treated by same concentration in 450 g/L of flame retardants but different Limit of Oxygen Index (L.O.I) after 20 times of water rinsing and under different baking temperature and different baking time.

| Specimen | DP | BTE (° C.) | BTM (second) | WR-L.O.I | TE (Yes/No) |
|---|---|---|---|---|---|
| T9 | 1050 | 180 | 120 | 25 | slight |
| T10 | 1050 | 180 | 160 | 28 | Yes |
| T11 | 1050 | 180 | 200 | 32 | Yes |
| T12 | 1050 | 180 | 240 | 36 | Yes |

Notation
DP denotes degree of polymerization for cellulose.
BTE denotes baking temperature.
BTM denotes baking time.
WR-L.O.I denotes limit of oxygen index (L.O.I) after 50 times of water rinsing.
TE denotes effect of test.

With all testing results obtained in foregoing flame retarding tests of natural cellulose nonwoven for all specimens shown in Tables 3 through 6, following facts can be realized for the natural cellulose nonwoven with flame-retarding capability of the present invention: When the content for flame retardant of N-(hydroxymethyl)-3-(methoxy phosphorus acyl) exceeds 200 grams per liter (g/L), the value of related limit of oxygen index (L.O.I) can reach over 25, when the content for flame retardant of N-(hydroxymethyl)-3-(methoxy phosphorus acyl) exceeds 350 grams per liter (g/L) to meet the requirements of American ASTM D6413-1999 and ASTM D2863-1995, the value of related limit of oxygen index (L.O.I) can reach over 32. Therefore, the associated embodiments of Tables 3 through 6 reflect that the present invention can really achieve well flame retarding effect.

Moreover, from all testing results obtained in foregoing flame retarding tests of natural cellulose nonwoven for all specimens after water rinsing for 20 times shown in Tables 7 through 10, the flame retarding capability for the nonwoven of the present invention not only can still maintain same original effect as that before water rinsing but also can meet the requirements of testing standards in American ASTM D6413-1999 and ASTM D2863-1995. Thus, it proves in self-explanatory manner that the flame-retarding capability for the long-acting natural cellulose nonwoven of the present invention substantially exceeds that of the conventional flame-retarding nonwovens in the general market, which is either coated flame retarding agent on the surface of nonwovens or mixed with conventional flame retarding agent.

In conclusion of the disclosure heretofore, because the cross-linking reaction for the flame retardant of N-(hydroxymethyl)-3-(methoxy phosphorus acyl) with natural cellulose nonwoven during fabricating process, the flame-retarding capability for fabrics made from the natural cellulose nonwoven of the present invention, even after water-rinsing for 20 times, can meet not only strict requirement in the quality control but also the requirements of testing standards in American ASTM D6413-1999 and ASTM D2863-1995.

Besides, the present invention can produce natural cellulose nonwoven with flame retarding capability in various demanded specifications in accordance with different mixed proportion in the flame retardant of N-(hydroxymethyl)-3-(methoxy phosphorus acyl) so that the decreasing rate of fiber strength is less than 10%. Moreover, the wastes of the natural cellulose nonwoven can be naturally degraded or decomposed to meet the requirements of environment protection so that it really has feature of industrial application, which meets basic criterion of the patentability. Accordingly, we submit the patent application in accordance with related patent laws.

What is claimed is:

1. A meltblown process for producing non-woven fabrics with flame-retarding properties from natural cellulose which comprises the following steps:
    (a) blend raw material comprising wood pulp and solvent of N-methylmorpholine N-oxide (NMMO) to form into a slurry, next additionally mix in as stabilizer 1,3-phenylene-bis 2-oxazoline into the slurry;
    then, agitate and crush the slurry of wood pulp, N-methylmorpholine N-oxide (NMMO) and 1,3-phenylene-bis 2-oxazoline (BOX) in a horizontal slurry blending machine and under a low temperature in a range between 60 and 80 degrees Celsius, wherein, said wood pulp is pulp cellulose of hard wood or soft wood with an α-cellulose percentage content being over 85% and a degree of polymerization (DP) being in a range between 500-1200;
    (b) evaporate extra water content from the prepared slurry by a Thin Film Evaporator (TFE) under a temperature in a range between 80 and 120 degrees Celsius, heating for 5 minutes to remove extra water content so that a spinning dope is formed with percentage water content of 5%-13%;
    (c) by means of meltblown process, the dope is extruded out of a bank of spinnerets to form cellulose filament bundle;
    (d) by means of an ejecting mist aerosol of water, the filament bundle is coagulated for regeneration, after post treatments of water rinsing, hydro-entangled needle punching and drying have been orderly applied, then nonwoven fabrics are produced from natural cellulose, wherein drying temperature is in a range between 100 and 130 degrees Celsius heating for a time range of 3-5 minutes to form normal natural cellulose nonwoven;
    (e) roll soaking the normal natural cellulose nonwoven with a flame retardant composition of N-(hydroxymethyl)-3-(methoxy phosphorus acyl) such that the percentage of rolling liquid is in a percentage range between 65%-70% and the concentration of N-(hydroxymethyl)-3-(methoxy phosphorus acyl) is in a range between 250-450 grams per liter (g/L);
    (f) orderly heat drying, twice baking, neutralizing, soaping clean, water rinse and baking dry the soaking rolled natural cellulose nonwoven,
    wherein the dry heating is performed under a temperature at 105 degrees Celsius heating for 10 seconds,
    first bake is performed under temperature in a range between 130 and 155 degrees Celsius heating for a time in a range of 60-120 seconds while the second bake is performed under temperature in a range between 165 and 180 degrees Celsius heating for a time in a range of 60-120 seconds;
    the neutralizing is performed in an alkaline solution with a concentration of 50 grams per liter (g/L) under a temperature in a range between 20 and 30 degrees Celsius;
    and the soaping clean is performed in an alkaline solution with a concentration of 2 grams per liter (g/L) having soaping powder concentration of 3 grams per liter (g/L) under a temperature in range between 20 and 30 degree of Celsius for 10 seconds; and
    (g). Successively alkaline clean, water rinse and dry, then coil the natural cellulose nonwoven from previous step to produce modified natural cellulose nonwoven of long-acting flame retarding properties.

2. The meltblown process for producing nonwoven fabrics with flame-retarding properties from natural cellulose as claimed in claim 1, wherein said concentration of said N-methylmorpholine N-oxide (NMMO) in step (a) is in percentage range between 50%-75%.

3. The meltblown process for producing non-woven fabrics with flame-retarding properties from natural cellulose as claimed claim 1, wherein said coil is form at a coiling speed in the coiling step (g) is in a range between 2-200 meters per minute.

4. The meltblown process for producing non-woven fabrics with flame retarding properties from natural cellulose as claimed in claim 1, which has a content percentage of cellulose in step (b) is in a range of 6-15%.

5. The meltblown process for producing non-woven fabrics with flame-retarding properties from natural cellulose as claimed in claim 1, wherein said dope has a viscosity in step (b) in a range between 300-30000 poise.

6. The meltblown process for producing non-woven fabrics with flame-retarding properties from natural cellulose as claimed in claim 1, with a light transmittance index in step (b) in a range between 1.470-1.495.

7. The meltblown process for producing non-woven fabrics with flame-retarding properties from natural cellulose as claimed in claim 1, with a melting index in step (b) in a range between 200-1000.

8. The meltblown process for producing non-woven fabrics with flame-retarding properties from natural cellulose as claimed in claim 1, with a basis weight of the natural cellulose nonwoven produced from meltblown process in step (g) is in a range between 10-300 grams per meter.sup.2.(g/m$^2$).

9. The meltblown process for producing non-woven fabrics with flame-retarding properties from natural cellulose as claimed in claim 1, which has a fineness of fiber for the natural cellulose non-woven produced from meltblown process in step (g) in a range between 1-15 um.

10. The meltblown process for producing non-woven fabrics with flame-retarding properties from natural cellulose as claimed in claim 1, wherein the natural cellulose nonwoven produced from meltblown process in step (g), has a tensile strength in mechanical direction (MD) thereof, which is over 15 kgf while the tensile strength in cross direction (CD) thereof is over 8 kgf.

11. The meltblown process for producing non-woven fabrics with flame-retarding properties from natural cellulose as claimed in claim 1, wherein said alkaline solution used for the soaping clean performed in step (f) is sodium hydroxide (NaOH) or sodium carbonate (Na.sub.2.COsub.3. or Na$_2$CO$_3$).

12. The meltblown process for producing non-woven fabrics with flame-retarding properties from natural cellulose as claimed and recited in claim 1, wherein said alkaline solution used for the alkaline clean performed in step (g) is sodium hydroxide (NaOH) or sodium carbonate (Na.sub.2.CO.sub.3. or Na$_2$CO$_3$).

13. The meltblown process for producing non-woven fabrics with flame-retarding capability from natural cellulose as claimed in claim 1, which includes a process for solvent recycling comprises following steps:

A. Bleaching: The bleaching process is performed by absorption of suspending active carbon by putting active carbon powder with good absorptivity and suspension ability in a percentage range of 0.05%-0.10% into the liquid of NMMO solvent to be de-colored; then alternate an air-blast mixing with absorption and the stationary suspending absorption treatments with a treating time ratio in a range between 1:3 to 1:6 for over 8 hours to finish the bleaching procedure;

B. Filtrating: The filtrating process is performed by bi-phase filtration of coarse filtering phase and fine filtering phase, first coarse filtering phase uses a general cartridge filter with filter aid composition comprising diatomite and cellulose which filter aid not only spreads over the surface of the filtering cartridge but also is put in the solution to be filtrated with content thereof in percentage range between 0.03%-0.05%, a minor puffing agent is also mixed therein to enhance filtrating speed without degeneracy; after completion of the coarse filtering phase, the filtering dregs and the residual liquid are centrifugal and dehydrating treated for recycling use so that the residual auxiliary filtering agent of dehydrated filter aid is reusable as auxiliary filtering effect remains;

a second fine filtering phase by using an Ultrafiltration (UF) filter so that the cleanness of the filtrate liquid is the same as that of the fresh solvent;

C. Concentrating: For low yield quantity of fiber, a tri-effect condensing method is adopted to dehydrate per ton of rinsing liquid in using 0.5 ton of steam with feature of high steam consumption but low electric power consumption while for high yield quantity of fiber, a Mechanical Vapor Recompression (MVR) condensing method is adopted to dehydrate per ton of rinsing liquid in using quantity range between 0.003-0.03 ton of steam with feature of low steam consumption but high electric power consumption;

the yield condensed liquid with solvent and condensed water in both foregoing condensing methods are recovered for reusing through each condensing method is only suitable for different specific yield quantity of fiber, wherein, the yield condensed liquid with solvent which is recycled for reusing as processing solvent and yield condensed water is recycled for reusing to rinse fiber; and D. Refining: Adopting temperature at 80 degrees Celsius (80° C.) low temperature oxidation and neutralizing reduction, using a percentage concentration in 35% of hydrogen peroxide (H.sub.2.O.sub.2. or H$_2$O$_2$) as oxidant and a percentage concentration in 85% of hydrazine hydrate (N.sub.2.H.sub.4.H.sub.2.O) as neutralizing reductant, the result is measured by electric potential titrating method; the NMMO content can be decreased down below 10 ppm so that not only the purity of NMMO is promoted but also the NMMO consumption can be decreased.

* * * * *